Figure 1:
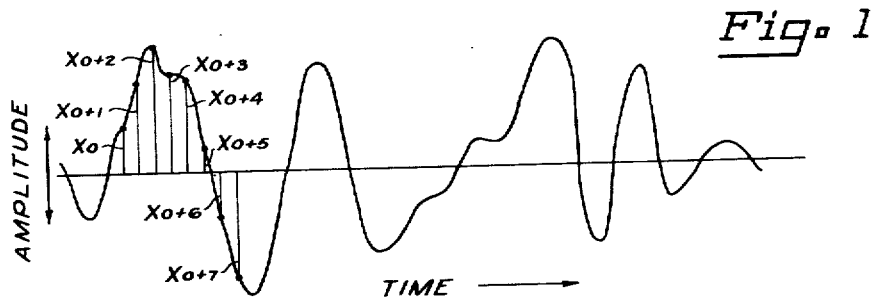

June 4, 1957  W. J. YOST  2,794,965
STATISTICAL INTERPRETATION OF SEISMOGRAMS
Filed May 25, 1953  2 Sheets-Sheet 1

WILLIAM J. YOST
INVENTOR.
BY D. Carl Richards
ATTORNEY

June 4, 1957 W. J. YOST 2,794,965
STATISTICAL INTERPRETATION OF SEISMOGRAMS
Filed May 25, 1953 2 Sheets-Sheet 2
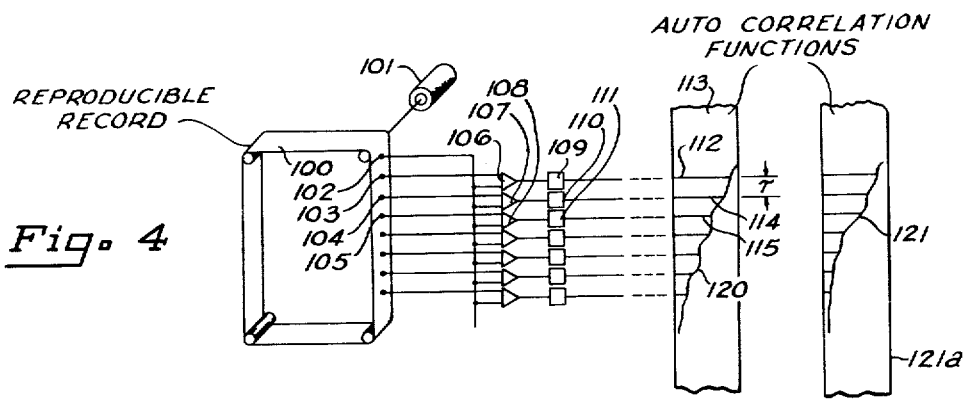
Fig. 4
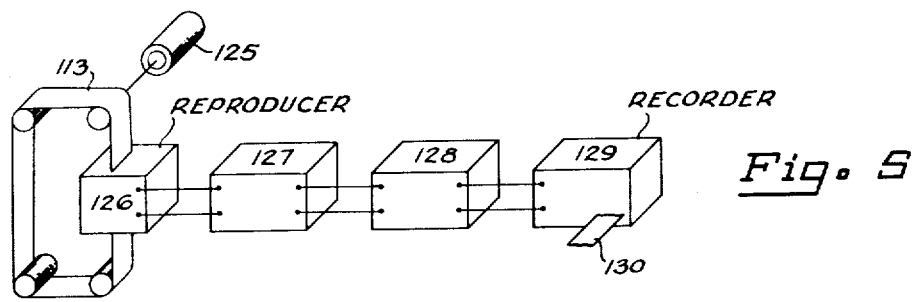
Fig. 5
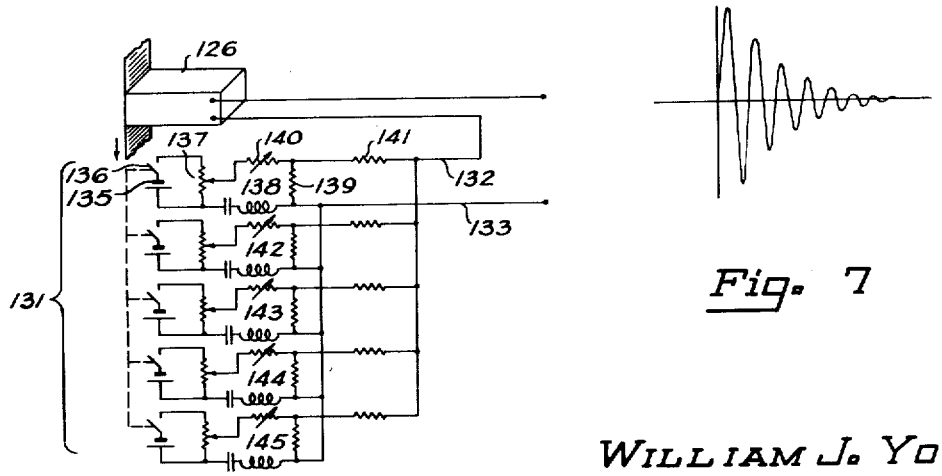
Fig. 6
Fig. 7
WILLIAM J. YOST
INVENTOR.
BY *D. Carl Richards*
ATTORNEY 2,794,965

Patented June 4, 1957

United States Patent Office

2,794,965
STATISTICAL INTERPRETATION OF SEISMOGRAMS

William J. Yost, Dallas, Tex., assignor, by mesne assignments, to Socony Mobil Oil Company, Inc., a corporation of New York Application May 25, 1953, Serial No. 357,261

4 Claims. (Cl. 340—15)

This invention relates to the analysis of time variable functions such as seismograms and more particularly to the utilization and modification of an operator common to other data obtained in a given geophysical province.

Although exploration methods in general have become highly developed, the geophysicist nevertheless faces problems yet unsolved when studying difficult areas. In a continuing effort to obtain more information from records of geophysical data, it has been found that such records are susceptible of analysis on a statistical basis. The result of such analysis of a seismogram, for example, often more clearly defines a seismic event definitely related to a subsurface condition than is possible through conventional methods.

The present invention will be found to be applicable to the analysis of geophysical data where a measured parameter having amplitude variations is plotted along a scale which is related to earth dimensions. Utilization is made of the fact that in a given geological area background conditions in general have characteristic features which within a first order of magnitude are similar for other points throughout the area and therefore can be treated on a common basis.

Broadly the method of the present invention relates to the exploration of a given geological province and comprises the steps of observing a plurality of different earth controlled functions having amplitude variations along a selected earth related scale each of which includes background components and related anomalous components all within the same province. From one of the earth controlled functions an operator is derived which is dependent primarily upon the background components. Operating functions are derived from each of the other earth controlled functions, and the differences between the operator and the operating functions are then measured more clearly to distinguish between the background components and the anomalous components.

In a more specific aspect of the present invention, a limited section of a base earth controlled function is utilized to obtain a "prediction operator" which is then utilized to derive from the base earth function a predicted earth controlled function which has an appearance superficially of the same nature as the base earth controlled function. However, the differences between the base function and the derived function represent non-predictable portions or "errors" which may then be considered as extraneous or unusual events in the earth function. The differences thus produced are recorded on a compatible scale and are exclusively representative of the anomalous components.

In another aspect of the invention, a "correlation function" of a record of typical background components for a given area is produced and is compared with the correlation function of the other earth controlled functions obtained in the area. Background components common to the correlation functions are thus readily distinguished, leaving for observation and study the anomalous components.

As will hereinafter more clearly appear, correlation functions may be used to characterize both the background components and the anomalous components of the earth controlled functions. The prediction operator may be used to characterize the earth controlled functions in terms of the background components only. Utilizing either of the two aspects of the present invention permits discrimination between the background and anomalous components.

Figure 3:
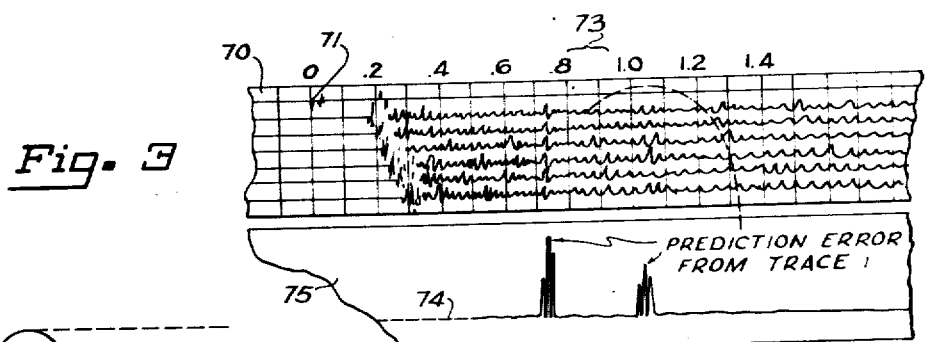
Figure 2:
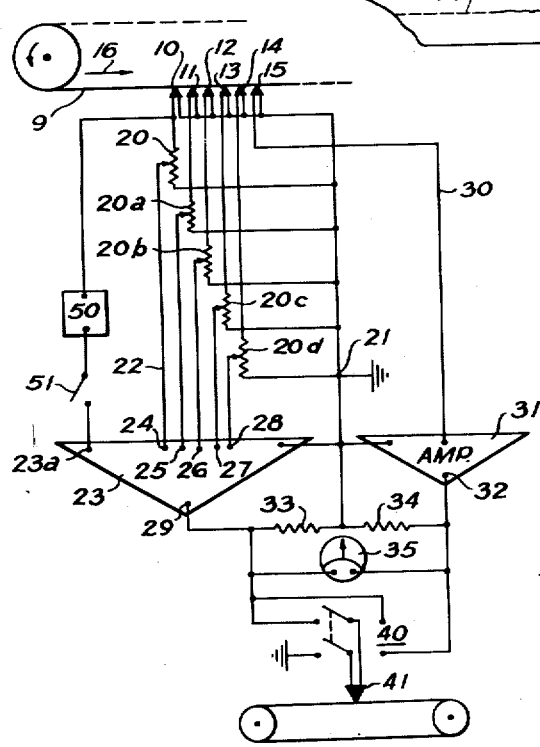

Numerous additional advantages and features of the invention are set forth in the following detailed description based upon the accompanying drawings in which:

Fig. 1 represents a restricted segment of a time variable function such as a seismogram;

Fig. 2 schematically illustrates an analyzing system suitable for carrying out the present invention;

Fig. 3 illustrates a conventional seismogram and an error function;

Fig. 4 diagrammatically illustrates the steps for producing a correlation function;

Fig. 5 illustrates the utilization of correlation functions;

Fig. 6 in part is a detailed diagram of function generators forming parts of the system of Fig. 5; and Fig. 7 is a plot of the voltage waveform produced by the function generators of Fig. 6.

While the invention is one of general application to the analysis of geophysical data, it is believed that it will be of assistance in presenting a description thereof to consider specifically the analysis of time variable earth controlled functions, such as seismograms, from which the applicability of the method to other geophysical data may become apparent. It will be recognized that the seismogram is an earth controlled function having anomalous and background components which appear or are plotted along a time scale, which scale is directly related to an earth dimension.

The use of a "prediction operator" as illustrated in connection with Figs. 1–3 will first be described, and thereafter the use of a "correlation function" as illustrated in Figs. 4–7 will then be described.

Referring first to Fig. 1, an arbitrary time variable function has been shown and may be considered to be representative of a short segment of a seismic record trace or signal. One procedure for obtaining a prediction operator involves converting the time variable function into a sequence of numbers by measuring the trace amplitudes at selected equally spaced consecutive values along the $x$-axis. More particularly the amplitudes $X_0$, $X_{0+1}$, $X_{0+2}$ ... $X_{0+n-1}$ are measured. To then compute the prediction operator it is necessary to choose $(n)$ consecutive values of $X$ starting with $X_0$, multiply each of the selected values by some coefficient, $A_k$, and equate the sum of the resultant products by $X_{0+n}$, which is a predicted value for $X_{0+n}$. Thus:

$$A_0 X_0 + A_{0+1} X_{0+1} + \ldots A_{0+n-1} X_{0+n-1} = \overline{X}_{0+n} \quad (1)$$

or $$\sum_{0}^{0+n-1} A_k X_k = \overline{X}_{0+n} \quad (2)$$

The above indicated operation is repeated $(m)$ times so that there are $(m)$ equations in the form of Equation 2, each involving the same A factors but different X factors. The number $(m)$ of equations is large compared to the number $(n)$ of X factors utilized, hence there are $(m)$ equations in $(n)$ unknowns where $(m > n)$. Under such limitations and conditions there is no unique set of values for A. In order to specify the A values, it is sufficient to require that the sum of the squares of the prediction errors taken over all ($m$) values be a minimum. This stated mathematically is as follows:

The expression, $$I = \sum_{l=0}^{m}(\overline{X}_{0+n+l} - X_{0+n+l})^2 = \sum_{l=0}^{m}\left\{\sum_{k=0}^{0+n-1} A_k X_{k+l} - X_{0+n+l}\right\}^2 \quad (3)$$

is to be made a minimum.

A solution to Equation 3 may be obtained by the "least squares" method. According to the Gaussian method for solving such least squares problems, the minimal condition is satisfied by solving the set of ($n$) simultaneous linear equations defined by $$\delta I/\delta A_k = 0 \text{ for } k = 0, 0+1 \ldots 0+n-1 \quad (4)$$

These are the basic computations that must be undertaken to determine the A values. The operations are indicated in a general way but are well understood by those skilled in the art. For a detailed description of statistical analysis reference may be had to Extropolation, Interpolation, and Smoothing of Stationary Times Series, by Wiener, John Wiley and Sons, Inc., 1950.

Having found the values for the constants $A_0$, $A_{0+1}$, $A_{0+n-1}$, they are then used to predict an $\overline{X}$ value for each $X$ value of the original transient. In accordance with the present invention the prediction operator is obtained from a segment of the record which represents background components as distinguished from reflection or anomalous portions thereof. Experience and an understanding of the general nature of a given geological area is of assistance in selecting a segment of a record for use in obtaining the prediction operator.

Having once obtained the values $A_0$, $A_{0+1}$, $A_{0+2}$, $A_{0+3}$ and $A_{0+4}$ from a background portion of a record either by the computations above described or otherwise, the interdependence of the A values is practically overcome by reason of the fact that in a given geophysical province changes from one record to another in the A values are second in order in their nature. Therefore, a process other than the complex computations may be followed to adjust a prediction operator computed from a base record to obtain predicted records from original records other than the base seismogram.

One manner of practicing the invention may now be understood by referring to Fig. 2. It will be assumed that a signal from a single seismic detector or geophone impressed upon a magnetic tape or wire 9 is detected by a plurality of detecting heads 10—15 and that this signal includes as a short time segment thereof a portion having the waveforms illustrated in Fig. 1. As the element 9 is driven past detecting heads 10—15 in the direction indicated by arrow 16, the signal is translated in its entirety into six electrical signals identical with each other but delayed one from another in time in dependence upon the velocity of the element 9 and the spacing between the adjacent detecting heads 10—15. The signals from detectors 10—14 are applied to separate but identical circuits. More particularly the signal from detector 10 is applied across a voltage divider or impedance 20, one terminal of which is connected directly to the detecting head 10 and the other terminal of which is connected to a ground point 21. A variable tap on the impedance 20 is connected by way of conductor 22 to a first input 24 of amplifier 23. In a similar manner, signals from detectors 11, 12, 13 and 14 are applied to inputs 25, 26, 27 and 28, respectively. Amplifier 23 is so constructed and arranged that the signals appearing at its output terminal 29 are proportional to the sum of the signals applied to the input terminals 24—28.

The signal from the detector 15 is applied by way of conductor 30 to a second amplifier 31 having amplification and frequency response characteristics identical with those of amplifier 23. The signal appearing at output terminal 32 is thus proportional only to the signal from detector 15. The signals from amplifiers 23 and 31 are impressed on impedances 33 and 34, respectively. Impedances 33 and 34 are connected at their common juncture to the ground terminal 21. A meter 35 is connected across the extremities of impedances 33 and 34 as to measure the difference between the signal outputs from amplifiers 23 and 31.

In utilizing the system thus described in a prediction process, the setting of the variable taps on the input potentiometers is made proportional to the A values of the prediction operator. More particularly, the tap on potentiometer 20 is adjusted to a value proportional to $A_0$. The tap on potentiometer 20$a$ is adjusted to a value proportional to $A_{0+1}$. Similarly the taps on potentiometers 20$b$, 20$c$ and 20$d$ are set proportional to $A_{0+2}$, $A_{0+3}$, $A_{0+4}$, respectively. Some of the A values may be of negative sign with respect to the rest, in which case the signal to be modified by a negative coefficient may merely be reversed in polarity by any suitable means. If the calculations for the values of $A_0 \ldots A_{0+4}$ have been properly made, then as the signal impressed on the element 9 is repeatedly detected and applied to amplifiers 23 and 31, there will be substantial identity between the signals appearing at terminals 29 and 32 and the meter 35 nominally will read zero.

If there is an unusual or anomalous event in the signal impressed on element 9 as upon the occurrence of a "reflection," as that term is generally understood in the seismic art, the prediction process, as here carried out by multiplying the signals from detectors 10—14 by the A value settings on the potentiometers, will fail to match the signal as detected by detector 15 and applied to amplifier 31. During portions of the record containing a reflection, the meter 35 will exhibit a large error. As has been indicated, the voltage sensed by meter 35 (the error in the prediction process) may be recorded by connecting the double pole, double throw switch 40 to its right hand position which connects the input of a magnetic recorder device 41 across, or in parallel with, meter 35. Thus there is produced a new seismic record which is the difference between the predicted record and the original or base record. If desired, switch 40 may be thrown to its left hand position to record the predicted function itself other than the error function.

Rather than compute a new operator for each additional signal on element 9 that might be detected by the transducers 10—15, advantage is taken of the original A values (the settings of the taps on potentiometers 20—20$d$) and the following procedure is adopted to adjust the prediction operator as to properly fit subsequent seismograms.

A gating unit 50 or its equivalent is connected as to be responsive to a suitable timing marker on the element 9 and operates in such a manner as to apply control pulses to terminal 23$a$ of amplifier 23 which blocks the amplifier except for but a preselected short segment of the signal to be studied.

For example, referring to Fig. 3 each seismic signal on the seismogram 70 comprise a complex ground wave pattern over a time interval of two seconds more or less following the time break 71 which coincides in time with the detonation of an explosive charge. The record 70 has been reproduced in such form as to show clearly a reflection between .7 and .8 second and thus is not the type that usually needs more detailed analysis. However the principle of the analysis may best be understood by reference to such a record. The application to poor records will then be apparent.

The gating unit 50, Fig. 2, responsive to time break 71, or to the initial burst of energy detected by transducer 10, is so constructed and arranged that when switch 51 is closed amplifier 23 is squelched, or its gain reduced to zero, except during the interval 73 between 0.8 second and 0.9 second. Thus only a short segment of any recorded signal is sampled and the error is sensed by meter 35. Each of the A functions ($A_0 \ldots A_{0+4}$) modifies the signal representative of this short segment. The taps on potentiometers 20—20d are then adjusted while observing the meter 35. Each of them is adjusted to produce a null reading on meter 35. When all such taps are adjusted for their respective minimums, the gating unit 50 is then disconnected, as by opening switch 51, whereby the seismic signal detected by transducers 10—15 would pass in its entirety through amplifiers 23 and 31 and the error function may then be observed or recorded for future study.

Although some liberty has been taken in plotting trace 74 on record 75 better to illustrate the foregoing principles, trace 74 may be taken as representative of a prediction error function such as would be obtained upon applying a prediction operator to the first or top signal trace on record 70. The presence of anomalous energy at a point corresponding with a readily apparent seismic reflection occurring between 0.7 and 0.8 second on the record is indicated in the error function, and a second error coinciding with a burst of energy occurring between 1.0 and 1.1 seconds on the seismic record 70 is also present. Such an error function represents unusual contributions to the seismic record. In general, the errors are attributable to reflection of energy from subsurface interfaces. While a somewhat idealized record has been utilized for the purpose of illustration, the same steps may be applied in the analysis of records which may be of such poor character from the standpoint of standard interpretation processes as to render them useless, in which case they would be discarded.

It will now be seen that this aspect of applicant's method comprises the utilization of a prediction operator obtained from calculations upon data from a base seismogram and comprises the steps of (1) modifying a restricted time segment of a second seismogram by the prediction operator, (2) comparing the restricted segment with that segment as modified by the prediction operator, (3) adjusting the operator for substantial identity between the compared functions, and (4) thereafter modifying the second seismogram in its entirety by its adjusted prediction operator to produce an output signal which nominally corresponds with the second seismic signal by delaying a predetermined time interval and which differs from the second seismogram in those portions of anomalous energy content.

While a particular system has been illustrated as suitable for utilizing a prediction operator, it will be apparent that the taps on potentiometers 20—20d may be controlled automatically in the adjustment of the prediction operator. Servo-systems suitable for such operations are well known to those skilled in the art.

It will further be apparent that applicant's method may be carried out completely by hand by measuring the selected ordinates corresponding with a restricted segment of a second seismic signal and adjusting step-wise in a single equation each of the A values of the prediction operator for a minimum error function rather than undertake the complex computation of a great number of simultaneous equations to obtain a new prediction operator.

While operation of the sysetm of Fig. 2 involves the reproduction of signals stored in phonographically reproducible form and while other types of recording in phonographically reproducible form may be substituted for the magnetic system illustrated, it will be appreciated that the method of the present invention may be carried out by the use of digital computing systems in which the basic operations above described may be readily carried out. Regardless of the characteristics of the particular type system employed whether it be automatic or by hand, the complex computations required for the derivation of the prediction operator for each seismic signal are eliminated and replaced by the relatively simple adjustment for a minimum in the difference between the function itself and the predicted function. So long as seismic signals under investigation are related by reason of their detection in a given geophysical province, a small number, or perhaps but a single prediction operator, may be successfully utilized in carrying out the prediction process on all such signals.

Having described the utilization of a "prediction operator" in the analysis of earth controlled functions, reference should now be had to Figs. 4–7 in which "correlation functions" are utilized in a basically similar manner to distinguish anomalous components of geophysical data from background components thereof. Here again the description will relate to the analysis of seismograms as representative of geophysical data in general.

The term "auto-correlation function" as used herein shall be considered in the same sense as used in Equation (0.424) found at page 5 in the publication entitled "Extrapolation, Interpolation, and Smoothing of Stationary Time Series" by Norbert Wiener (1950), i. e.:

$$R_{(\tau)} = \lim_{T \to \infty} \frac{1}{2T} \int_{-T}^{T} y(t) y(t+\tau) dt \qquad (5)$$

From an operational standpoint the auto-correlation function may be obtained from a seismic record in the manner illustrated in Fig. 4. A reproducible record, for example, as impressed on a magnetic tape 100 is made cyclically reproducible by forming it in a loop and driving it over suitable guides or rollers under the power of a source or motor 101. A plurality of detecting heads 102, 103, 104, 105 et cetera are spaced at selected equal intervals along record 100, where such intervals are donated by the factor ($\tau$) of Equation 5.

The output from detector 102 is applied to one input of each of multipliers 106, 107, 108 et cetera. The output from detector 103 is applied to the input of multiplier 106; the output of detector 104 is connected to the input of multiplier 107; and the output of detector 105 is connected to the input of multiplier 108. The remaining detectors similarly are connected to additional multipliers so that the instantaneous output of each of the multipliers is equal to the product of the signal from the first detector 102 and the succeeding detector connected thereto. For example the output of multiplier 106 is proportional to the product of the signals from detectors 102 and 103; the output from multiplier 107 is proportional to the product of the outputs of detectors 102 and 104; and the output from multiplier 108 is proportional to the product of the outputs of detectors 102 and 105.

The outputs of the multipliers are then applied to integrators. For example the output of multiplier 106 is applied to integrator 109. The output of multiplier 107 is applied to integrator 110. The output of multiplier 108 is applied to integrator 111. The integrated output from integrator 109 is recorded or plotted as an ordinate 112 on a chart 113 whose base or abscissa is plotted along the left hand margin thereof. At a point spaced along the abscissa an interval $\tau$ there is plotted the ordinate which is representative of the output of integrator 110. Spaced along the abscissa an interval $2\tau$ there is plotted the ordinate 115 representative of the output of integrator 111. Thus by obtaining the integrated products of two signals spaced integral multiples of $\tau$ from $-T$ and $+T$ as required by Equation 5, the auto-correlation function of the seismic signal recorded on record 100 will be obtained. A line 120 joining ordinates 112, 114 and 115 together is the auto-correlation function of the record 100.

In accordance with the present invention the auto-correlation function 120 is obtained from a first record taken in a given geological area which is considered to be principally dominated by noise components. A seismogram having no apparent anomalous or reflection events thereon may be considered to be of this type record and would thus be utilized to produce the correlation function 120. When the latter is the case, the auto-correlation function 120 represents a characterization of the background or noise components in a given area. In a similar manner the anomalous or reflection components characteristic of a given area are characterized in a second auto-correlation function 121 which is obtained by similarly operating on a representative reflection record obtained in the same geological area. The auto-correlation function 121 characterizes principally the reflection energy in the area. The correlation functions 120 and 121 may then be utilized as is explained in connection with Fig. 5 to develop a means to detect positively the presence of anomalous energy components even though substantially masked by background or noise components.

Referring to Fig. 5 the auto-correlation function 120 on film 113 is detected by forming it in a loop driven by a motor 125 in order to pass it through a detecting unit 126. The signal thus produced is passed through a first signal channel 127 and then through a second channel 128. The output of channel 128 is impressed upon a recorder 129 to permit ultimate recordation of the signal from detector 126. Signal channel 127 is so constructed and arranged, as will hereinafter be shown, substantially to cancel entirely the signal from detector 126. When this is done, the correlation function of the background components on chart 113 is completely nullified and the signal output applied to recorder 129 is zero.

The anomalous correlation function 121 impressed upon chart 121a is then substituted for the background correlation function on chart 113. A signal representing a characterization of the anomalous components is then applied to channels 127 and 128. Adjustments are then made in channel 128 to produce a maximum output in the signal applied to recorder 129.

Once channel 128 has been adjusted as above described, any correlation function of a record from the particular area reproduced by detector 126 may be analyzed readily to determine the existence or non-existence of anomalous components whether they are masked wholly or partially by background or noise components. Effectively an optimum filter is provided so that only anomalous components are passed through channels 127 and 128 to the recorder 129. Thus there is produced a modified correlation function on the record 130 at the output of recorder 129 which is the correlation function of anomalous components only.

In general, the correlation function will decrease from an initially high value as the abscissae increase in values, and will approach zero for large values. The channels 127 and 128 preferably are of such construction and operation as to permit generation of similar functions.

More particularly referring to Fig. 6, suitable generators for producing a modifying effect on the correlation function of the type above described include a voltage generator 131 whose output is connected in series opposition to the output of the voltage from detector 126. More specifically, the voltage appearing between conductors 132 and 133 is adjusted to be of a value equal to and opposite the voltage from detector 126. The voltage generator 131 may comprise a series of units each of which produces at each output a damped oscillatory function of different frequency wherein the maximum amplitude of the damped function and the time constant thereof may be adjustable. For example a first generator comprises a source, such as a battery 135, connected in series circuit with switch 136 and a potentiometer 137. Upon closure of switch 136 a voltage immediately appears across potentiometer 137. The voltage thus produced across resistor 137 is applied to an RLC circuit 138. An oscillatory voltage such as shown in Fig. 7 thus appears across the output resistor 139. The magnitude of this voltage may be adjusted by varying the position of the tap on potentiometer 157. The oscillatory voltage decays to zero depending upon the time constant of the RLC circuit 138. This time constant may be adjusted by varying resistance 140. Thus the output across resistance 139 connected through coupling resistor 141 appears between conductors 132 and 133. In a similar manner the outputs of the additional RLC circuits 142, 143, 144 and 145 are coupled to conductors 132 and 133.

The foregoing elements forming voltage generator 131 are representative of the type circuits that may be included in channel 127. Similar circuits may be included in channel 128 with provisions for adjusting the amplitude and time constant of the damped output function. In operation, all switches associated with the RLC circuits 138, 142—145 are simultaneously closed in timed relation with the generation of a signal from detector 126. The voltages thus produced appear across conductors 132 and 133 and by reason of blending of phase and amplitude of a multiplicity of signals, may be made to match identically the character found in the correlation functions 120 and 121.

By utilizing the voltages thus produced in connection with a record characterizing background components and then modifying the circuit in accordance with or in dependence upon a record characterizing anomalous or reflection components, other records obtained in the same geological area may be compared, as by producing a signal for transmission through channels 127 and 128, to determine whether or not they contain reflection components. The information thus obtained by the analysis may be utilized to control and extend an exploration program in a given area and thus lend to the production of a more detailed survey and an increased knowledge of the lithologic character of the area. Utilization of characteristic noise or background components from data obtained in a given area characterizes within a first degree the entire area and thus lends to an analysis of all data obtained in that area.

It will be appreciated that the systems illustrated in Figs. 2 and 4–6 are to be taken as illustrative of the principle involved for it is readily apparent that the operations necessary to carrying out the method of this invention may be performed by other types of equipment that probably would be just as suitable as the system illustrated.

Digital computers may readily be programmed to carry out the necessary computational steps. Analog type computers similarly may be employed. Further, the method may be performed entirely by hand in performing the computational steps necessary to derive the modified functions as above described. Further, while the description has related to the analysis of seismograms, it will now be appreciated that other sets of geological data obtained in the same geophysical province may be subject to the analyses described wherein noise or background components of the data are characterized and tempered by anomalous variations in the observed data. Therefore while modifications of the invention have been specifically illustrated and described, it will be understood that further modifications will now suggest themselves to those skilled in the art and it is intended to cover such modifications as fall within the scope of the appended claims.

What is claimed is:

1. The method of seismically exploring a given area which comprises producing a first function dependent upon earth movement at a seismic detecting station in the time interval immediately following the generation of seismic waves in said area, generating from said first function a plurality of secondary functions which correspond with said first function but which are delayed in time respectively one from the other, modifying the amplitudes of said secondary functions in dependence upon an operator function derived from a record of earth movement at a point in said area different from said detecting station, and producing an output function dependent upon the combination of the modified secondary functions.

2. In the analysis of phonographically reproducible seismic records obtained in a given geological area by a statistical prediction process wherein a physical analog of a prediction operator is devised from calculations based upon a first recorded seismic signal, the method comprising the steps of (1) passing restricted segments of each of the other recorded seismic signals through said analog, (2) adjusting said analog for the production of output signals representative of each of said restricted segments which have substantial identity with an adjacent unmodified portion of the corresponding signal, (3) passing each of the recorded seismic signals through said analog in their entirety to generate output signals which nominally correspond with said recorded seismic signals, and (4) recording as a function of time the differences between each of the output signals and the recorded seismic signal from which the output signal was generated.

3. In geophysical exploration the method which comprises detecting earth controlled functions at each of two different locations in the same geological area wherein the two functions are single valued in relation to a selected axis and comprise background components and related anomalous components, generating in response to the fractional part of the first of said functions occurring during a first interval along its axis a modified function which is characterized by substantial identity with the fractional part of the first of said functions occurring during a second interval along said axis adjacent to said first interval and thereafter similarly and proportionately modifying both of said earth controlled functions in their entirety to produce two operating functions, and measuring the differences between each of said two functions and the operating function derived therefrom to emphasize said anomalous components relative to said background components.

4. In the analysis of at least two phonographically reproducible records of data obtained in a given geological area by a statistical prediction process wherein a physical analog of a prediction operator is obtained from calculations based upon a portion of a first of said records, the method comprising the steps of (1) passing a signal representative of at least a segment of the second of said records through said physical analog to modify said segment in dependence upon said prediction operator, (2) comparing the modified segment with an adjacent but unmodified segment thereof, (3) adjusting the analog of said prediction operator for substantial identity between said modified and unmodified segments, (4) passing a signal representative of all of the second of said records through the adjusted physical analog to produce an output signal which nominally is representative of said second record, and (5) recording said output signal.

References Cited in the file of this patent
UNITED STATES PATENTS

| | | |
|---|---|---|
| 2,243,729 | Ellis | May 27, 1941 |
| 2,258,859 | Mitelman | Oct. 14, 1941 |
| 2,286,567 | Parr | June 16, 1942 |
| 2,294,627 | Parr | Sept. 1, 1942 |
| 2,348,411 | Petty | May 9, 1944 |
| 2,355,826 | Sharpe | Aug. 15, 1944 |
| 2,676,206 | Bennett et al. | Apr. 20, 1954 |

OTHER REFERENCES

Article: "Detection of Reflections on Seismic Records by Linear Operators," from Geophysics, July 1953.

UNITED STATES PATENT OFFICE
CERTIFICATE OF CORRECTION

Patent No. 2,794,965                  June 4, 1957

William J. Yost

It is hereby certified that error appears in the printed specification of the above numbered patent requiring correction and that the said Letters Patent should read as corrected below.

Column 3, line 17, after "under" insert a hyphen; line 40, after "second" strike out "in"; column 4, line 59, for "comprise" read -- comprises --; column 6, line 31, for "donated" read -- denoted --.

Signed and sealed this 29th day of October 1957.

(SEAL)
Attest:

KARL H. AXLINE
Attesting Officer

ROBERT C. WATSON
Commissioner of Patents